United States Patent
McEachern et al.

(10) Patent No.: US 9,621,569 B1
(45) Date of Patent: Apr. 11, 2017

(54) METHOD AND APPARATUS FOR DETECTING CYBER ATTACKS ON AN ALTERNATING CURRENT POWER GRID

(71) Applicants: Alexander McEachern, Oakland, CA (US); Ronald Hofmann, Oakland, CA (US)

(72) Inventors: Alexander McEachern, Oakland, CA (US); Ronald Hofmann, Oakland, CA (US)

( * ) Notice: Subject to any disclaimer, the term of this patent is extended or adjusted under 35 U.S.C. 154(b) by 0 days.

(21) Appl. No.: 14/869,865

(22) Filed: Sep. 29, 2015

(51) Int. Cl.
G06F 3/00 (2006.01)
H04L 29/06 (2006.01)
H02J 3/00 (2006.01)

(52) U.S. Cl.
CPC ............ H04L 63/1416 (2013.01); H02J 3/00 (2013.01); H04L 63/1441 (2013.01)

(58) Field of Classification Search
CPC . H04L 63/20; H04L 63/1433; H04L 63/0218; G06F 21/55; F01L 1/34; F01L 2001/0537; F01L 2800/00; F01L 2820/041; F02D 2041/001; F02D 2250/28; F02D 37/02; F02D 41/083; F02D 41/1498; F02D 41/40; F02D 41/009; F02N 11/04; G01M 15/12; F02P 7/07
USPC ........................................................ 726/1, 23
See application file for complete search history.

(56) References Cited

U.S. PATENT DOCUMENTS

| | | | | |
|---|---|---|---|---|
| 2011/0288692 | A1* | 11/2011 | Scott ....................... | G06F 21/55 700/297 |
| 2012/0290235 | A1* | 11/2012 | Schaefer ............ | G01R 31/3624 702/63 |
| 2014/0343878 | A1* | 11/2014 | Gudmundsson ... | G01R 19/2513 702/64 |
| 2015/0281278 | A1* | 10/2015 | Gooding ................. | H04L 63/20 726/1 |

* cited by examiner

Primary Examiner — Joseph P Hirl
Assistant Examiner — Sayed Beheshti Shirazi

(57) ABSTRACT

A method and apparatus for detecting cyber attacks on remotely-operable elements of an alternating current distribution grid. Two state estimates of the distribution grid are prepared, one of which uses micro-synchrophasors. A difference between the two state estimates indicates a possible cyber attack.

4 Claims, 2 Drawing Sheets

METHOD AND APPARATUS FOR DETECTING CYBER ATTACKS ON AN ALTERNATING CURRENT POWER GRID

STATEMENT REGARDING FEDERALLY SPONSORED RESEARCH OR DEVELOPMENT

The invention disclosed herein was conceived and developed in part during work on Award Number DE-AR0000340, titled "Micro-Synchrophasors for Distribution Systems," from the Advanced Research Projects Agency-Energy (ARPA-E) of the U.S. Department of Energy.

CROSS-REFERENCE TO RELATED APPLICATIONS

Application Ser. No. 14/808,439, "Method and Apparatus for Precision Phasor Measurements Through a Medium-voltage Distribution Transformer"

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of measurement of electric parameters.

More particularly, the present invention is in the technical field of voltage and current phasor measurements on an alternating current (a.c.) power distribution grid, and employing those phasor measurements to detect a cyber attack on remotely-operable elements of that power distribution grid.

Electric power distribution grids, including substations, are commonly used to move a.c. power from high-voltage transmission lines towards a set of loads, and sometimes to move power from distributed generation resources.

These electric power distribution grids, including substations, contain elements such as switches, bus connecting elements, interrupting elements, and transformer tap changing elements. To improve energy efficiency and grid reliability, these elements are often configured for remote operation, for example by an operator at a Distribution Grid Control Center.

Such a remote operation generally takes place through a communication network. Often, the remotely-operable element can report its present state. For example, a distribution grid control center might be able to ask a remotely-operable switch to report if it is "on" or "off", and a distribution control center could instruct such a remotely-operable switch to change its state from "off" to "on".

Such automated systems can be subject to cyber attack, an event in which unauthorized individuals or organizations attempt to take control of remotely-operated elements in a distribution grid, or attempt to cause remotely-operated elements to incorrectly report their state, or both.

In our Department of Energy ARPA-E Project DE-AR0000340, titled "Micro-Synchrophasors for Distribution Systems," we have been investigating the application of synchrophasor measurements to medium-voltage distribution grids, as opposed to the traditional application to high-voltage transmission grids. Due to smaller inductances and shorter distances on distribution grids compared to transmission grids, the phase angle changes during interesting phenomena on distribution grids are much smaller. We have determined that, for distribution grid applications, a angular resolution for voltage phasors and current phasors of ±0.015° could be useful.

Such voltage phasor and current phasor measurements can be used to detect cyber attacks on distribution systems.

SUMMARY OF THE INVENTION

The present invention is a method and apparatus for detecting cyber attacks on remotely-operable elements on a distribution grid by periodically comparing a first state estimation of the distribution grid based on commands to and reports from the remotely-operable elements, with a contemporaneous second state estimation of the distribution grid based on precise phasor measurements performed on the distribution grid. A difference between the two contemporaneous state estimations indicates that the distribution grid may be under cyber attack.

DETAILED DESCRIPTION OF THE INVENTION

Figure 1:
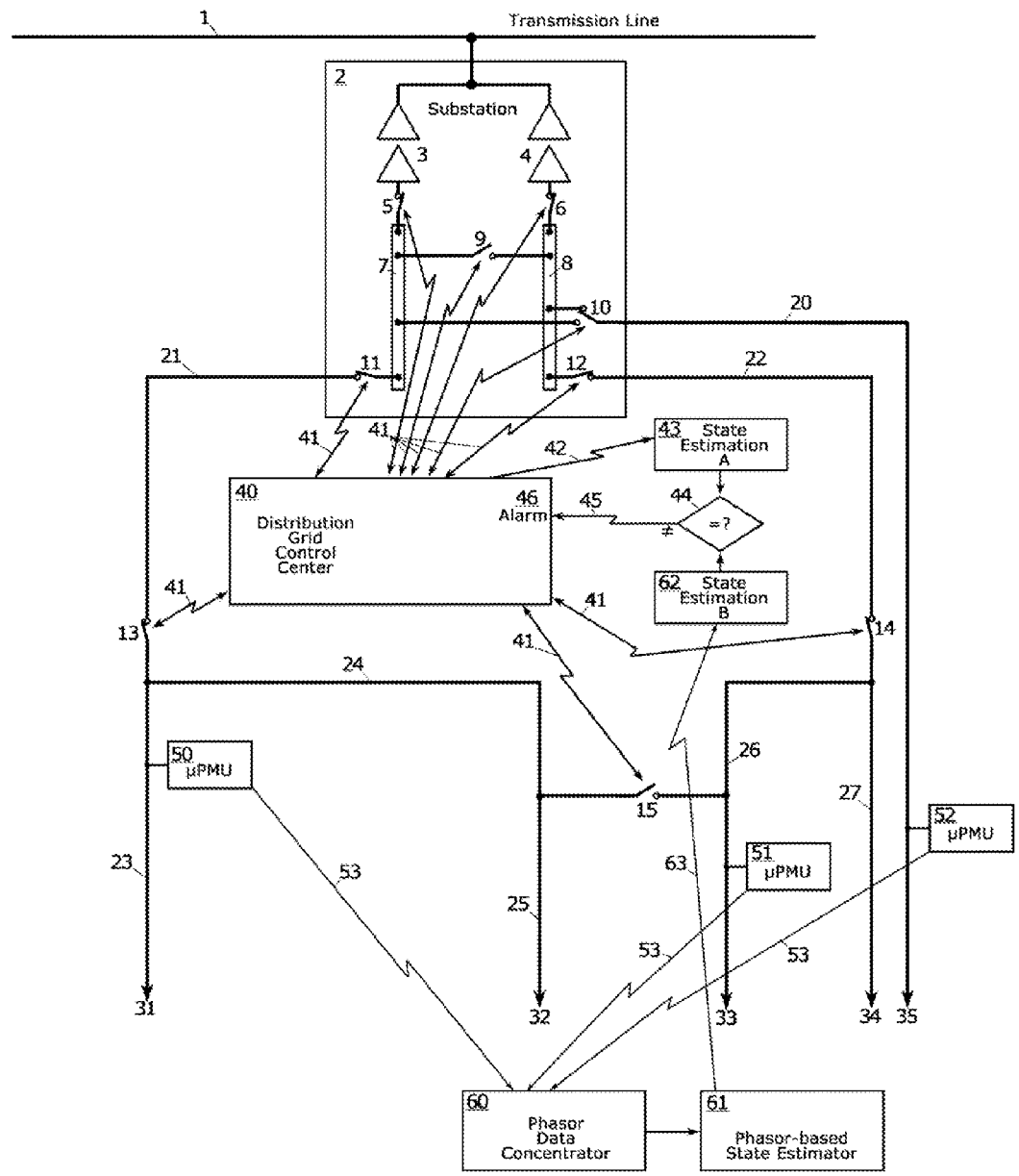
FIG. 1 is an illustration of the present invention.
Figure 2:
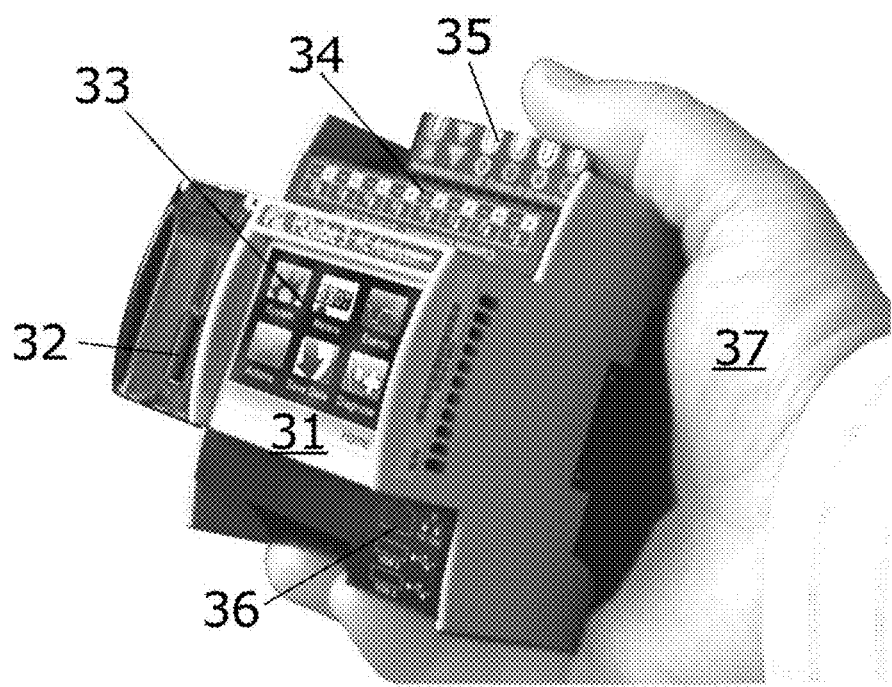
FIG. 2 is a view of an exemplary instrument used in the present invention.

Turning our attention to FIG. 1, we see an illustrative example: a one-line schematic representation of a 3-phase high-voltage transmission line 1, well known in the art, that provides alternating current power to a substation 2, which is equipped in this illustrative example with two transformers 3,4. The medium-voltage secondaries of the two transformers 3,4 are connected through remotely-operable elements 5,6, which are switches in the present example, to two substation buses 7,8. The two substation buses can be tied together through a remotely-operable element 9, which, in the present example is a normally-open switch.

Medium-voltage a.c. power leaves the substation through other remotely-operable elements 10,11,12 and travels in the usual ways, well known in the art, in this illustrative example through distribution feeders 20,21,22,23,24,25,26,27, in some cases passing through additional remotely-operable elements 13,14,15 to ultimately reach loads 31,32,33,34,35. The exact nature of the loads 31,32,33,34,35 are not important to the present invention.

Continuing to examine FIG. 1, we see a Distribution Grid Control Center 40 with connections 41 to the remotely-operable elements 5,6,9,10,11,12,13,14,15 by any typical electric power grid communication system, known to those familiar with the art.

Examining the illustration of the connections 41 to the remotely-operable elements, we see that the arrows are bi-directional, indicating that the Distribution Grid Control Center 40 can both instruct the remotely-operable elements 5,6,9,10,11,12,13,14,15 to change to a different state, e.g. change from "off" to "on", and the remotely-operable elements 5,6,9,10,11,12,13,14,15 may in some cases also report their state to the Distribution Grid Control Center 40, both types of communications taking place through the connections 41.

The exact nature of the connections 41 is unimportant to the present invention except that the connections 41 may be subject to a disruptive cyber attack. Such a disruptive cyber attack could, for example, cause one or more of the remotely-operable elements 5,6,9,10,11,12,13,14,15 to transition to an undesired state; or it could, for example, cause one or more of the remotely-operable elements 5,6,9,10,11, 12,13,14,15 to inaccurately report its state, e.g. report that it is "off" when it is in fact "on".

Continuing to examine FIG. 1, we see three instruments 50,51,52 (referred to by those familiar with the art as micro-phasor-measurement-unit(s), abbreviated μPMU) for measuring micro-synchrophasors that specifically measure time-synchronized magnitude and phase angle of voltages and, in some cases, currents on the distribution feeders 20, 23, 26. It will be recognized by those familiar with the art that the location in the distribution grid that has been selected for these μPMU's 50, 51, 52 in FIG. 1 is simply illustrative of the present invention, and that other placements incorporating more or fewer μPMU's could be selected.

The μPMU's 50, 51, 52 report their time-synchronized magnitudes and phase angles through communication channels 53, the precise nature of which is not important to the present invention except that it is unlikely to be subject to the attack at the same time and in the same way as the other connections 41, to a Phasor Data Concentrator 60 of a type well-known in the art, which calculates various phasor and power flow parameters such as phase angle differences, the exact list and nature of which is not critical to the present invention. These phasor and power flow parameters are passed to a Phasor-based State Estimator 61, which has algorithms, the nature of which do not limit the present invention, that employ the values of the phasor and power flow parameters to form an estimate of the state of this distribution grid.

By the "state" of this distribution grid, we mean the present state of all of the elements in this distribution grid, including the remotely-operable elements 5,6,9,10,11,12,13, 14,15. Returning our attention to the Distribution Grid Control Center 40, we see that, based on the information it receives from remotely-operable elements 5,6,9,10,11,12, 13,14,15 through their connections 41, it periodically prepares State Estimation A 43 and communicates it through communication channel 42, the nature of which is not critical to the present invention. A second State Estimate B 62, contemporaneous with State Estimate A 43, is prepared by the Phasor-based State Estimator 61 and communicated through a connection 63.

A State Estimation comparison block 44, the details of which are not critical to the present invention, compares State Estimation A 43 with State Estimation B 62. The State Estimation comparison block 44 may, for example, simply compare the estimated states prepared in State Estimation A 43 and State Estimation B 62; or it may also include an evaluation of confidence in the estimations prepared by State Estimation A 43 and State Estimation B 62, or use other algorithms to conclude whether the two State Estimations are sufficiently equal.

If the algorithm comparison block 44 determines that the two State Estimations 43, 62 are not equal, it concludes that the distribution grid may be under a cyber attack. It could, for example, use a communication channel 45 to activate an alarm 46 in the Distribution Grid Control Center. It will be apparent to one of ordinary skill that the above description, which assumes a single-phase system, can be readily extended to three-phase systems.

Turning our attention now to FIG. 3, we see an illustration of a Micro Synchrophasor Instrument 31 which implements one possible embodiment of the present invention. (The hand 37 in the illustration is shown to visually indicate approximate scale, and does not play any part in the present invention.) This Micro Synchrophasor Instrument 31 is one embodiment of the uPMU instrument 52 shown in FIG. 1.

The Micro Synchrophasor Instrument 31 incorporates a display 33 and communications means 36. The display 33 is not an essential element to the present invention. The Micro Synchrophasor Instrument 31 also incorporates voltage inputs 35 for measuring voltage phasors, current inputs 34 for optionally measuring the current phasors, and computing means 32 for converting raw voltage measurements and optional raw current measurements into phasor measurements.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method for detecting a possible cyber attack on an alternating-current power distribution grid, wherein the alternating-current power distribution grid excluding high voltage transmission lines, and the alternating-current power distribution grid having a plurality of remotely-operable elements, each remotely-operable element having a present state, the method comprising the following steps:
   periodically obtaining a first set of information about the present state of each remotely-operable element through a communication network or from instructions sent to the each remotely-operable element through a communication network, or both;
   employing the first set of information obtained about the present state of each remotely-operable element to prepare a first state estimation of the alternating current power distribution grid;
   periodically, but contemporaneously with obtaining the first set of information employed to prepare the first state estimation, making a plurality of micro-synchrophasor measurements at not less than two locations on the alternating current power distribution grid, wherein the micro-synchrophasor measurements being made with an angular resolution of ±0.015° or better;
   using the micro-synchrophasor measurements to calculate a plurality of synchrophasor parameter values;
   using the synchrophasor parameter values to calculate a second state estimation of the alternating current power distribution grid, wherein the second state estimation being contemporaneous with the first state estimation;
   comparing the first state estimation to the second state estimation, and detecting a possible cyber attack if the first state estimation and the contemporaneous second state estimation are not equal.

2. The method of claim 1, in which the step of comparing the first state estimation to the contemporaneous second state estimation includes an evaluation of confidence in the accuracy of the first state estimation, an evaluation of confidence in the accuracy of the contemporaneous second state estimation, or both, and uses the evaluation of confidence in accuracy to determine if there is sufficient information to conclude whether the first state estimation and the second state estimation are not equal.

3. An apparatus for detecting a possible cyber attack on an alternating-current power distribution grid, wherein the alternating-current power distribution grid excluding high-voltage transmission lines, and the alternating-current power distribution grid having a plurality remotely-operable elements, each of remotely-operable element having a present state, each such remotely-operable element capable of receiving commands to change its state, or each of remotely-operable element capable of reporting its present state, or both, the apparatus comprising the following elements, such elements not necessarily co-located:

- a first state estimator element that periodically calculates a first state estimate of the alternating-current power distribution grid based on the commands to, and the reports from, the remotely operable elements;
- a plurality, but not less than two, micro-synchrophasor instruments periodically making synchrophasor measurements on the alternating-current power distribution grid, each of micro-synchrophasor instrument capable of making micro-synchrophasor measurements with an angular resolution of ±0.015° or better, each of micro-synchrophasor instrument capable of reporting its synchrophasor measurements to a Phasor Data Concentrator element, such Phasor Data Concentrator element capable of calculating a plurality of synchrophasor and power flow parameters;
- a second state estimator element that calculates a second state estimate, contemporaneous with the first state estimate, of the alternating-current power distribution grid based on the plurality of synchrophasor and power flow parameters;
- a state estimate comparison element that compares the first state estimate with the contemporaneous second state estimate, and if the state estimates are not equal the state estimate comparison element reports that the alternating-current power distribution grid is under a possible cyber attack; wherein the first state estimator, the second state estimator and the state estimate comparison elements are executed inside the hardware apparatus.

4. The apparatus of claim 3 in which the state estimate comparison element includes an evaluation of confidence in the accuracy of the first state estimate, the accuracy of the second state estimate, or both, and uses the evaluation of confidence in accuracy to determine if there is sufficient information to conclude whether the first state estimate and the second state estimate are not equal.

* * * * *